US008638110B2

(12) United States Patent
Lee et al.

(10) Patent No.: US 8,638,110 B2
(45) Date of Patent: Jan. 28, 2014

(54) HIGH RESOLUTION CIRCUIT FOR CONVERTING CAPACITANCE-TO-TIME DEVIATION

(75) Inventors: Sung Sik Lee, Miryang (KR); Myung Lae Lee, Daejeon (KR); Gunn Hwang, Seoul (KR); Chang Auck Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 513 days.

(21) Appl. No.: 12/675,111

(22) PCT Filed: Jul. 21, 2008

(86) PCT No.: PCT/KR2008/004252
§ 371 (c)(1),
(2), (4) Date: Feb. 24, 2010

(87) PCT Pub. No.: WO2009/028798
PCT Pub. Date: Mar. 5, 2009

(65) Prior Publication Data
US 2011/0133758 A1 Jun. 9, 2011

(30) Foreign Application Priority Data

Aug. 29, 2007 (KR) .................. 10-2007-0087257

(51) Int. Cl.
*G01R 27/26* (2006.01)
(52) U.S. Cl.
USPC ........... 324/679; 327/115; 327/158; 327/122; 375/359; 375/376; 375/326
(58) Field of Classification Search
USPC ....................................................... 324/679
See application file for complete search history.

(56) References Cited

U.S. PATENT DOCUMENTS

| 4,201,945 A | * | 5/1980 | Ohgishi et al. ............. 455/183.1 |
| 4,327,323 A | * | 4/1982 | Walker .......................... 324/663 |
| 5,006,952 A | * | 4/1991 | Thomas ..................... 361/283.2 |
| 5,495,414 A | * | 2/1996 | Spangler et al. ................ 701/45 |
| 5,790,107 A | * | 8/1998 | Kasser et al. ................. 345/174 |
| 5,903,197 A | * | 5/1999 | Kikugawa ....................... 331/17 |
| 5,923,715 A | * | 7/1999 | Ono ............................... 375/376 |
| 5,940,428 A | * | 8/1999 | Ishiguro et al. ............... 375/150 |
| 6,140,853 A | * | 10/2000 | Lo ................................... 327/157 |

(Continued)

FOREIGN PATENT DOCUMENTS

KR    1994-0012846 A    6/1994

OTHER PUBLICATIONS

Zeljko Ignjatovic et al., "An Interface Circuit for Measuring Capacitance Changes Based Upon Capacitance-to-Duty Cycle (CDC) Converter," IEEE Sensors Journal, Jun. 2005, pp. 403-410, vol. 5, No. 3, IEEE.

(Continued)

*Primary Examiner* — Benjamin M Baldridge

(57) ABSTRACT

There is provided a high resolution circuit for converting a capacitance-to-time deviation including a capacitance deviation detecting unit generating two detection signals having a phase difference corresponding to variations of capacitance of an micro electro mechanical system (MEMS) sensor; a capacitance deviation amplifying unit dividing frequencies of the two detection signals to amplify the phase difference corresponding to the capacitance deviation; and a time signal generating unit generating a time signal having a pulse width corresponding to the amplified phase difference.

19 Claims, 8 Drawing Sheets

(56) References Cited

U.S. PATENT DOCUMENTS

| | | | |
|---|---|---|---|
| 6,326,795 | B1 | 12/2001 | Matsumoto et al. |
| 6,348,821 | B1* | 2/2002 | Schwartz ..................... 327/122 |
| 6,373,235 | B1* | 4/2002 | Barker ....................... 324/76.53 |
| 7,119,555 | B2* | 10/2006 | Takekawa et al. ............ 324/683 |
| 7,205,776 | B2 | 4/2007 | Kinoshita et al. |
| 7,723,898 | B2* | 5/2010 | Wöhrle ......................... 310/314 |
| 8,111,075 | B2* | 2/2012 | Uhov et al. ................... 324/673 |
| 2005/0253596 | A1* | 11/2005 | Kitano et al. ................. 324/658 |
| 2006/0055416 | A1 | 3/2006 | Kinoshita et al. |
| 2006/0158268 | A1* | 7/2006 | McCorquodale et al. ...... 331/34 |
| 2006/0280278 | A1* | 12/2006 | Schabel et al. ................. 377/47 |
| 2007/0222529 | A1* | 9/2007 | Carichner et al. ............. 331/44 |
| 2007/0242778 | A1* | 10/2007 | Chen et al. .................... 375/326 |
| 2008/0056423 | A1* | 3/2008 | Jeon .............................. 375/359 |
| 2008/0191921 | A1* | 8/2008 | Scholz et al. ................. 341/166 |
| 2008/0265953 | A1* | 10/2008 | Acar et al. .................... 327/115 |
| 2008/0303536 | A1* | 12/2008 | Uhov et al. ................... 324/676 |
| 2009/0140787 | A1* | 6/2009 | Shiratsuchi et al. .......... 327/254 |

OTHER PUBLICATIONS

International Search Report for PCT/KR2008/004252 filed on Jul. 21, 2008.

Written Opinion of the International Searching Authority for PCT/KR2008/004252 filed on Jul. 21, 2008.

\* cited by examiner

HIGH RESOLUTION CIRCUIT FOR CONVERTING CAPACITANCE-TO-TIME DEVIATION

TECHNICAL FIELD

The present invention relates to a circuit for converting a capacitance-to-time deviation, and more particularly, to a high-resolution circuit for converting a capacitance-to-time deviation.

The invention has been supported by IT R&D Program of MIC/IITA [2006-S-054-02, Development of CMOS based MEMS processed multi-functional sensor for ubiquitous environment].

BACKGROUND ART

An MEMS (Micro Electro Mechanical System) sensor is formed by combining micro mechanical device (an embedded sensor in a semiconductor chip, a valve, a gear, a reflector, and an actuator) and a computing circuit. The MEMS sensor varies own capacitance according to external environment.

And, a circuit for converting a capacitance-to-time deviation detects variations of the capacitance of the MEMS sensor and outputs a time signal that has a pulse width corresponding to the detected variations of the capacitance.

However, in a case of the conventional circuit for converting a capacitance-to-time deviation, when the variation of the capacitance of the MEMS sensor is very small, the pulse width of the time signal also becomes very narrow. That is, since the circuit for converting a capacitance-to-time deviation has low resolution, it is difficult for a circuit that uses the time signal output from the circuit for converting a capacitance-to-time deviation to perform an accurate operation.

In a conventional art, in order to solve the problem, there has been proposed a method of increasing a driving voltage of the circuit for converting a capacitance-to-time deviation so that a time signal has a relatively wider pulse width despite a small variation of the capacitance. However, the method needs a higher driving voltage then before. Therefore, the method cannot be used in a circuit having a micro size and low power consumption.

DISCLOSURE OF INVENTION

Technical Problem

As described above, since the circuit for converting a capacitance-to-time deviation according to the conventional art has low resolution, when a capacitance deviation of an MEMS sensor is small, a pulse width of a time signal that reflects the capacitance deviation becomes very small.

Further, when a driving voltage is increased to improve the resolution of the circuit for converting a capacitance-to-time deviation, it is difficult for a microcircuit having low power consumption to use this.

Technical Solution

According to an aspect of the present invention, there is provided a high resolution circuit for converting a capacitance-to-time deviation including: a capacitance deviation detecting unit generating two detection signals having a phase difference corresponding to variations of capacitance of an micro electro mechanical system (MEMS) sensor; a capacitance deviation amplifying unit dividing frequencies of the two detection signals to amplify the phase difference corresponding to the capacitance deviation; and a time signal generating unit generating a time signal having a pulse width corresponding to the amplified phase difference.

The capacitance deviation detecting unit may include a first capacitance detecting unit performing a charging and discharging operation according to a first capacitance to generate a first detection signal having a first frequency; and a second capacitance detecting unit performing a charging and discharging operation according to a second capacitance to generate a second detection signal having a second frequency. The first capacitance detecting unit may include a first comparator having a first value when a voltage charged and discharged by the first capacitance has a level equal to or less than that of a reference voltage and otherwise, a second value; a first charging switch applying a charging current to the first capacitance when the first detection signal has the first value; and a first discharging switch discharging the voltage charged in the first capacitance when the first detection signal has the second value. The second capacitance detecting unit may include a second comparator having a first value when the voltage charged and discharged by the second capacitance has a level equal to or less than that of the reference voltage, and otherwise, a second value; a second charging switch applying a charging current to the second capacitance when the second detection signal has the first value; and a second discharging switch discharging the voltage charged in the second capacitance when the second detection signal has the second value.

The capacitance deviation amplifying unit may include a first signal frequency dividing unit dividing a frequency of the first detection signal to generate a first frequency-divided signal; and a second signal frequency dividing unit dividing a frequency of the second detection signal to generate a second frequency-divided signal. The first signal frequency dividing unit may include a plurality of first D flip-flops connected in multiple stages, the first D flip-flops each having inverted output fed back as input and receiving the first detection signal and output signals at previous stages as clocks. The second signal frequency dividing unit may include a plurality of second D flip-flops connected in multiple stages, the first D flip-flops each having inverted output fed back as input and receiving the second detection signal and output signals at previous stages as clocks.

The time signal generating may include a first logic gate performing an exclusive OR (XOR) operation of the first frequency-divided signal and the second frequency-divided signal to generate the time signal. The time signal generating unit may further include a second logic gate performing an AND operation of the first frequency-divided signal and the second frequency-divided signal to initialize operations of the capacitance deviation detecting unit and the capacitance deviation amplifying unit.

Advantageous Effects

As set forth above, according to exemplary embodiments of the invention, the high resolution circuit for converting a capacitance-to-time deviation amplifies a phase difference corresponding to variations of capacitance of an MEMS sensor and generates a time signal having a pulse width corresponding to the amplified phase difference such that a time signal having a high resolution can be generated.

Further, since an additional increase in driving voltage is not required to perform the above-described operation, the high resolution circuit for converting a capacitance-to-time deviation can be stably used in a micro-circuit having low power consumption.

BEST MODE FOR CARRYING OUT THE INVENTION

Figure 1:
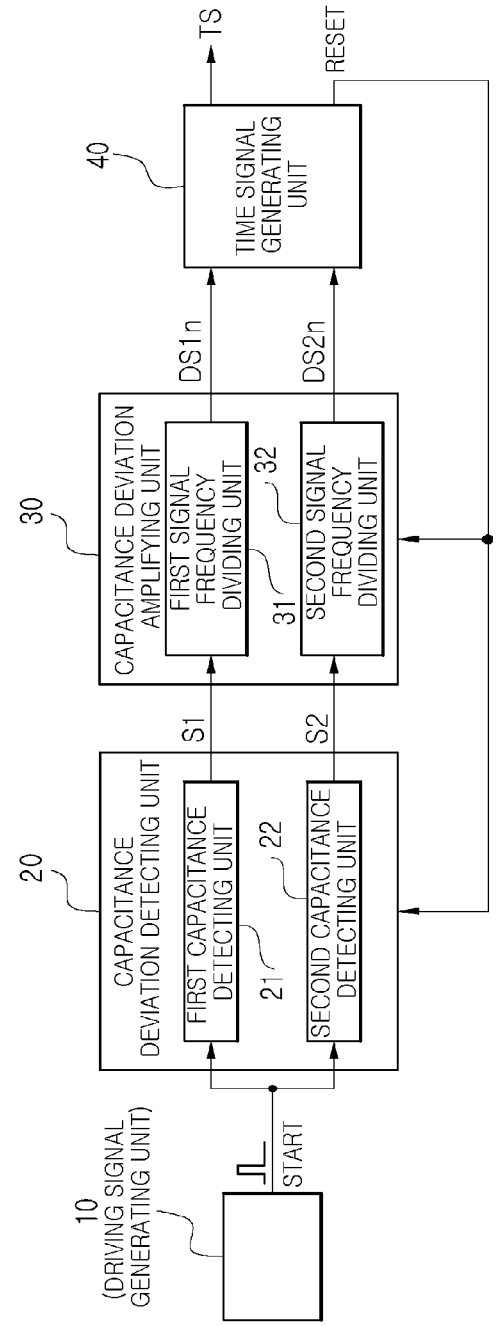
FIG. 1 is a circuit diagram illustrating a high resolution circuit for converting a capacitance-to-time deviation according to an exemplary embodiment of the present invention.

Hereinafter, exemplary embodiments of the present invention will now be described in detail with reference to the accompanying drawings. However, in description of operation principles associated with the embodiments of the present invention, detailed description of a known art or configuration is omitted because it may obscure the spirit of the present invention unnecessarily. In the following description, well-known functions or configurations are not described in detail since they would obscure the invention in unnecessary detail.

Also, in the drawings, the same reference numerals are used throughout to designate the same or similar components.

FIG. 1 is a circuit diagram illustrating a high resolution circuit for converting a capacitance-to-time deviation according to an exemplary embodiment of the present invention.

As shown in FIG. 1, the high-resolution circuit for converting a capacitance-to-time deviation includes a driving signal generating unit 10, a capacitance deviation detecting unit 20, a capacitance deviation amplifying unit 30, and a time signal generating unit 40.

Hereinafter, functions of the components will be described.

The driving signal generating unit 10 generates a pulse signal to determine a driving start point of the circuit for converting a capacitance-to-time deviation, that is, a driving signal start, and supplies the generated driving signal start to the capacitance deviation detecting unit 20.

The capacitance deviation detecting unit 20 includes a first capacitance detecting unit 21 and a second capacitance detecting unit 22. The first and second capacitance detecting units 21 and 22 detect variations of capacitance of an MEMS sensor that are caused by an external stimulus, to generate two detection signals S1 and S2, respectively. Here, the two detection signals S1 and S2 have a phase difference corresponding to the variations of capacitance of the MEMS sensor. That is, the first and second capacitance detecting units 21 and 22 perform the charging and discharging operation on the basis of first and second capacitances, respectively, of the MEMS sensor to generate the first and second detection signals S1 and S2, respectively, which have frequencies corresponding to the first and second capacitances.

The capacitance deviation amplifying unit 30 includes a first signal frequency dividing unit 31 and a second signal frequency dividing unit 32 that correspond to the first capacitance detecting unit 21 and the second capacitance detecting unit 22, respectively. The first and second signal frequency dividing units 31 and 32 of the capacitance deviation amplifying unit 30 divide the frequencies of the two detection signals S1 and S2, respectively, by $2^n$. The capacitance deviation amplifying unit 30 amplifies a phase difference between the two detection signals S1 and S2. That is, the phase difference corresponding to the capacitance deviation is amplified.

The time signal generating unit 40 performs a logical XOR (Exclusive OR) operation on the two frequency dividing signals DS1n and DS2n that are output from the capacitance deviation amplifying unit 30 to generate a time signal TS that has a pulse width corresponding to the amplified phase difference.

Further, the time signal generating unit 40 may perform a logical AND operation on the two frequency dividing signals DS1n and DS2n to generate a reset signal reset to reset the operation of the circuit for converting a capacitance-to-time deviation.

Figure 2:
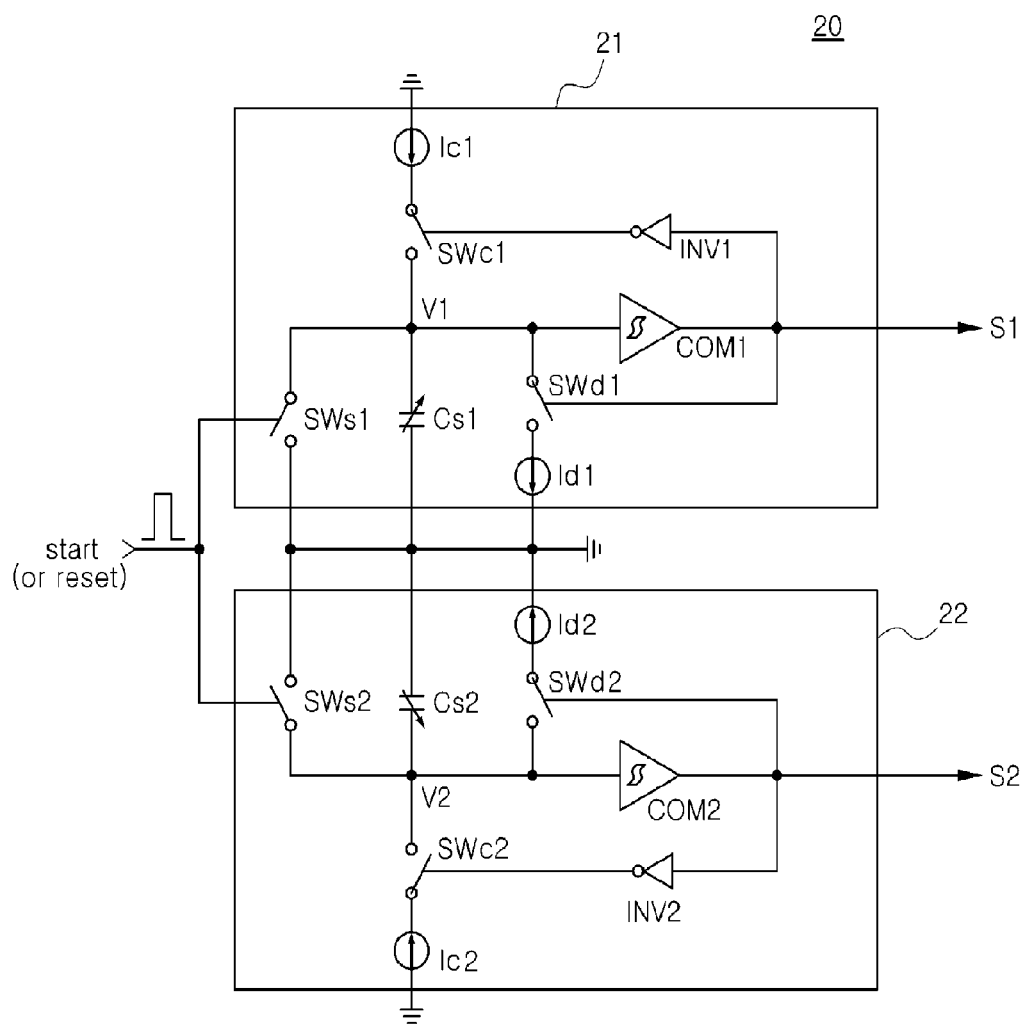
FIG. 2 is a detailed view illustrating a capacitance deviation detecting unit of FIG. 1.

FIG. 2 is a view illustrating a detailed configuration of a capacitance deviation detecting unit of FIG. 1.

Hereinafter, it is assumed that the MEMS sensor changes two capacitances according to a stimulus applied from the outside, and the first and second capacitances of the MEMS sensor are expressed as first and second capacitors Cs1 and Cs2 in an equivalent circuit.

Referring to FIG. 2, the first capacitance detecting unit 21 includes a first comparator COM1, a first inverter INV1, a first charging switch SWc1, a first discharging switch SWd1, and a first driving switch SWs1.

When a first voltage V1 that is charged by the first capacitor Cs1 has a level equal to or more than that of a reference voltage, the first comparator COM1 outputs a detection signal S1 at a high level, and otherwise, a detection signal S1 at a low level. The first inverter INV1 inverts the detection signal S1 output from the first comparator COM1. The first charging switch SWc1 is turned on when an output signal of the first inverter INV1 is at a high level, and applies a first charging current Ic1 to the first capacitor Cs1. The first discharging switch SWd1 is turned on when the detection signal S1 of the first comparator COM1 is at a high level to discharge electric charges from the first capacitor Cs1 through a first discharging current Id1. When the driving signal start is activated, the first driving switch SWs1 discharges electric charges from the first capacitor Cs1 to initialize the first capacitance detecting unit 21.

The second capacitance detecting unit 22 includes a second comparator COM2, a second inverter INV2, a second charging switch SWc2, a second discharging switch SWd2, and a second driving switch SWs2.

When a second voltage V2 that is charged by the second capacitor Cs2 has a level equal to or more than a reference voltage, the second comparator COM2 outputs a detection signal S2 at a high level, and otherwise, a detection signal S2 at a low level. The second inverter INV2 inverts the detection signal S2 output from the second comparator COM2. The second charging switch SWc2 is turned on when the output signal of the second inverter INV2 is at a high level, and applies a second charging current Ic2 to the second capacitor Cs2. The second discharging switch SWd2 is turned on when the detection signal S2 output from the second comparator COM2 is at a high level to discharge electric charges from the second capacitor Cs2 through a second discharging current Id2. When the driving signal start is activated, the second driving switch SWs2 discharges electric charges from the second capacitor Cs2 to initialize the second capacitance detecting unit 22.

Preferably, current amounts of the first and second charging currents Ic1 and Ic2 may be the same as those of the first and second discharging currents Id1 and Id2. In this way, the charging and discharging speed of the first and second capacitors Cs1 and Cs2 is only determined by the capacitances, and the two detection signals S1 and S2 have a phase difference that reflects a phase difference between the first and second capacitors Cs1 and Cs2.

Further, each of the first and second comparators COM1 and COM2 is formed of a Schmitt trigger comparator that outputs a low-level signal when a voltage has a lower level than the reference voltage and a high-level signal when a voltage has a higher level than the reference voltage.

Further, the first and second driving switches SWs1 and SWs2 can be turned on and off according to the reset signal reset as well as the driving signal start. That is, the first and second SWs1 and SWs2 are turned on according to the reset signal reset instead of the driving signal start to initialize the first and second capacitance detecting units 21 and 22.

Figure 3:
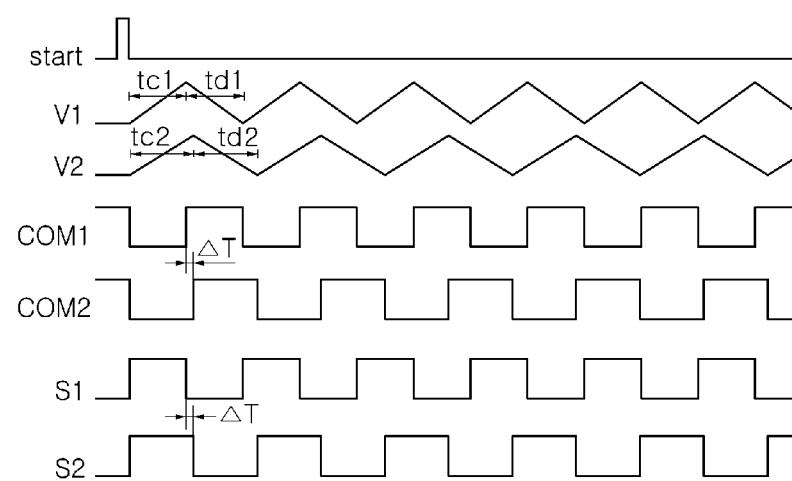
FIG. 3 is a signal timing diagram illustrating the operation of the capacitance deviation detecting unit of FIG. 2.

Hereinafter, referring to FIG. 3, the operation of the capacitance deviation detecting unit, shown in FIG. 2, will be described. In FIG. 3, for the convenience of explanation, it is assumed that the capacitance of the first capacitor Cs1 is smaller than that of the second capacitor Cs2.

First, when the driving signal start is clocked and the first and second SWs1 and SWs2 are instantaneously turned on, the charges charged in the first and second capacitors Cs1 and Cs2 are all discharged, and all of the first and second voltages V1 and V2 become 0V.

The first and second comparators COM1 and COM2 receive the first and second voltages V1 and V2, which are 0V, to output the low-level detection signals S1 and S2, respectively.

The first and second inverters INV1 and INV2 invert the detection signals S1 and S2, respectively, to generate high-level signals. The first and second charging switches SWc1 and SWc2 are turned on in response to the generated high-level signals to apply the first and second charging currents Ic1 and Ic2 to the first and second capacitors Cs1 and Cs2, respectively.

Then, the first and second capacitors Cs1 and Cs2 start to be charged with first and second charging currents Ic1 and Ic2, respectively.

However, since the capacitance of the first capacitor Cs1 is smaller than that of the second capacitor Cs2, the first voltage V1 of the first capacitor Cs1 increases at a higher rate than the second voltage V2 of the second capacitor Cs2.

Then, before the second comparator COM2, the first comparator COM1 outputs the detection signal S1 that is shifted from a low level to a high level. The discharging switch SWd1 is turned on first, and the first capacitor Cs1 only performs a discharging operation.

After a predetermined period of time passes, if the level of the second voltage V2 of the second capacitor Cs2 also increases to a predetermined voltage level, the second comparator COM2 outputs the detection signal S2 that is shifted to a low level to a high level, and the second discharging switch SWd2 is turned on. Therefore, the second capacitor Cs2 also performs a discharging operation.

However, the discharging speed of each of the first and second capacitors Cs1 and Cs2 varies according to the capacitance deviation between the first and second capacitors Cs1 and Cs2. That is, the first voltage V1 of the first capacitor Cs1 drops faster than the second voltage V2 of the second capacitor Cs2.

As such, when the capacitance deviation occurs between the first and second capacitors Cs1 and Cs2, the first and second capacitors Cs1 and Cs2 (tc1<tc2 and td1<td2) have different charging and discharging speeds from each other. As a result, the detection signals S1 and S2 have different frequencies. A phase difference $\Delta T$ that corresponds to the capacitance deviation between the first and second capacitors Cs1 and Cs2 occurs between the two detection signals S1 and S2.

Figure 4:
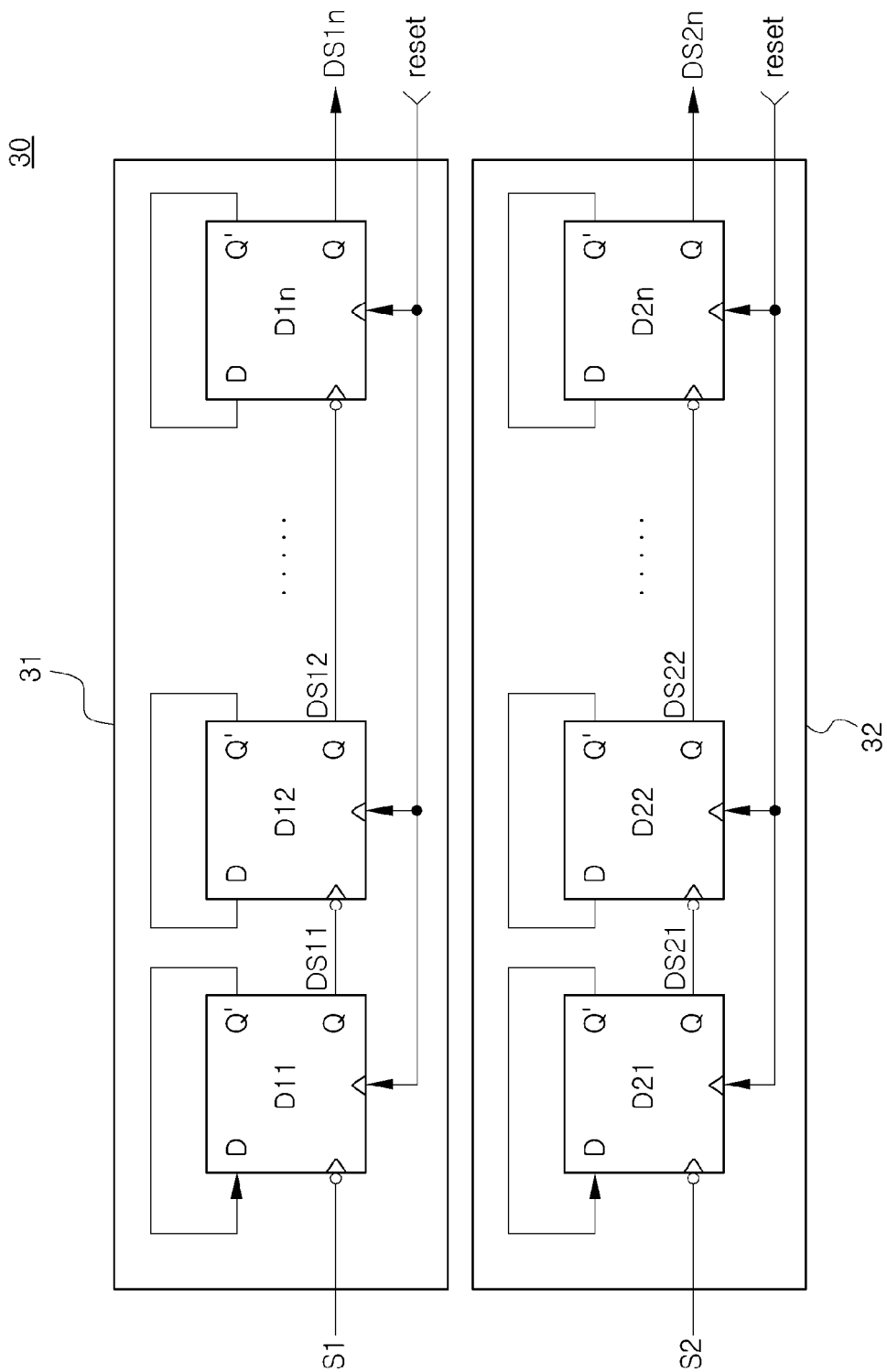
FIG. 4 is a detailed circuit diagram of a capacitance deviation amplifying unit of FIG. 1.

FIG. 4 is a detailed circuit diagram illustrating the phase difference amplifying circuit of FIG. 1.

Referring to FIG. 4, the capacitance deviation amplifying unit 30 includes a first signal frequency dividing unit 31 and a second signal frequency dividing unit 32. The first signal frequency dividing unit 31 includes a plurality of D flip-flops D11 to D1n that are connected in multiple stages. Each of the D flip-flops D11 to D1n divides the frequency of an input signal by 2. The second signal frequency dividing unit 32 includes D flip-flops D21 to D2n that are connected in multiple stages. Each of the D flip-flops D21 to D2n divides the frequency of an input signal by 2.

Preferably, inverted output of each of the plurality of D flip-flops D11 to D1n and D21 to D2n is fed to input thereof. Further, the plurality of D flip-flops D11 to D1n receive a detection signal and output signals of the D flip-flops D11 to D1(n−1) at previous stages as clocks, and the plurality of D flip-flops and D21 to D2n receive the detection signal and output signals D21 to D2(n−1) at previous stages as clocks. Specifically, the D flip-flops D11 and D21 positioned at first stages receive the detection signals S1 and S2 as clocks, respectively. The other D flip-flops D12 to D1n and D22 to D2n receive the output signals DS11 to DS1(n−1) and DS21 to DS2(n−1) of the D flip-flops D11 to D1(n−1) and D21~D1(n−1) as clocks, respectively.

Figure 5:
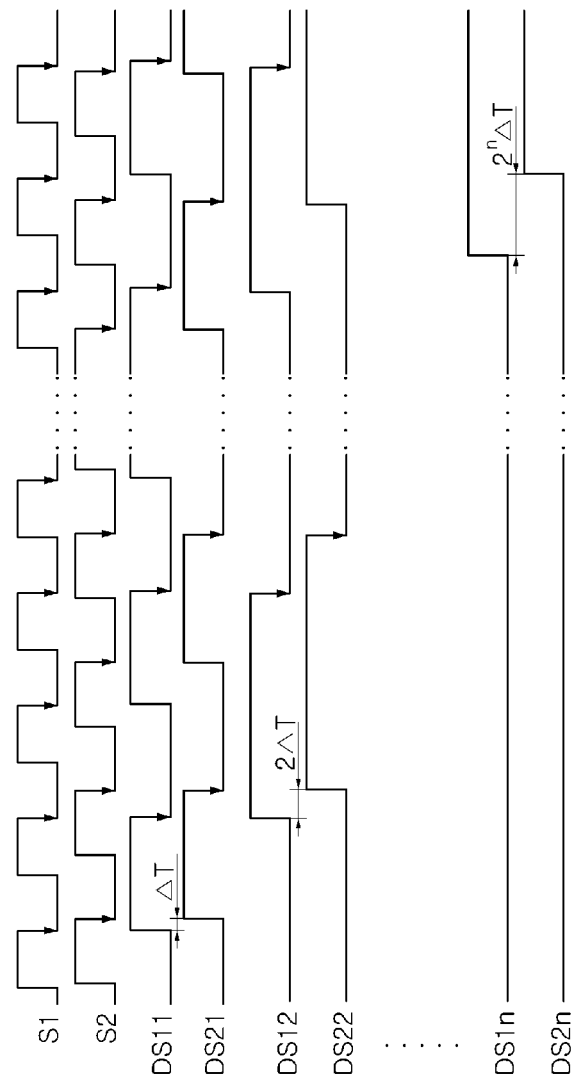
FIG. 5 is a signal timing diagram illustrating the operation of the capacitance deviation amplifying unit of FIG. 4.

Hereinafter, the operation of the capacitance deviation amplifying unit, shown in FIG. 4, will be described with reference to FIG. 5.

When the two detection signals S1 and S2 are input as clocks, the D flip-flops D11 and D21 positioned at the first stages are synchronized and clocked with falling edges of the detection signals S1 and S2 to output first output signals DS11 and DS21 that have frequencies obtained by dividing the frequencies of the detection signals S1 and S2, respectively, by 2.

Further, the D flip-flops D12 and D22 positioned at second stages are synchronized and clocked with falling edges of the first output signal DS11 and DS21 to output second output signals DS12 and DS22 that have frequencies obtained by dividing the frequencies of the output signals DS11 and DS21, respectively. That is, the D flip-flops D12 and D22 output the output signals DS11 and DS21 that have the frequencies obtained by dividing the frequencies of the detection signals S1 and S2, respectively, by 4.

According to the same principle, the D flip-flops D13 to D1n and D23 to D2n positioned at the other stages divide frequencies of signals output from the D flip-flops D12 to D1(n−1) and D22 to D2(n−1) positioned at previous stages, respectively, by 2. As a result, the D flip-flops D1n and D2n positioned at final stages output frequency-divided signals DS1n and DS2n that have frequencies obtained by dividing frequencies of the detection signals S1 and S2, respectively, by $2^n$.

The two frequency-divided signals DS1n and DS2n output from the capacitance deviation amplifying unit 30 have a phase difference $2^n\Delta T$ that is obtained by amplifying the phase difference $\Delta T$ between the detection signals S1 and S2 that are input to the capacitance deviation amplifying unit 30 by $2^n$ times.

Figure 6:
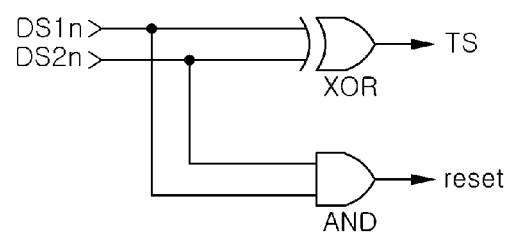
FIG. 6 is a detailed circuit diagram illustrating a time signal generating unit of FIG. 1.

FIG. 6 is a detailed circuit diagram illustrating the time signal generating unit of FIG. 1.

Referring to FIG. 6, the time signal generating unit 40 includes an XOR logic gate XOR and an AND logic gate AND. The XOR logic gate XOR performs a logical XOR operation on the two frequency-divided signals DS1n and DS2n that are output from the first signal frequency dividing unit 31 and the second signal frequency dividing unit 32, respectively, to generate a time signal TS. The AND logic gate AND performs a logical AND operation on the frequency-divided signals DS1n and DS2n AND to generate a reset signal reset.

Figure 7:
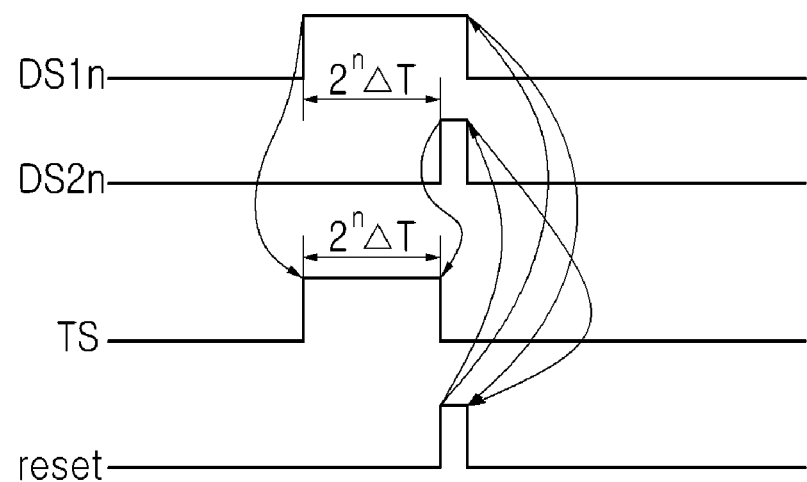
FIG. 7 is a signal timing diagram illustrating the operation of the time signal generating unit of FIG. 6.

Hereinafter, the operation of the time signal generating unit, shown in FIG. 6, will be described with reference to FIG. 7.

The XOR logic gate XOR performs the logical XOR operation on the two frequency-divided signals DS1n and DS2n that have the phase difference $2^n\Delta T$ amplified by $2^n$ from the first signal frequency dividing unit 31 and the second signal frequency dividing unit 32 to generate the time signal TS that has a pulse width corresponding to the phase difference $2^n\Delta T$ amplified by $2^n$.

At the same time, the AND logic gate AND performs the logical AND operation on the two frequency-divided signals DS1n and DS2n to generate the reset signal reset. Here, the reset signal reset is shifted from a low level to a high level when each of the two frequency-divided signals DS1n and DS2n is at a high level, and the reset signal reset is shifted from a high level to a low level when each of the frequency-divided signals DS1n and DS2n is at a low level.

Figure 8:
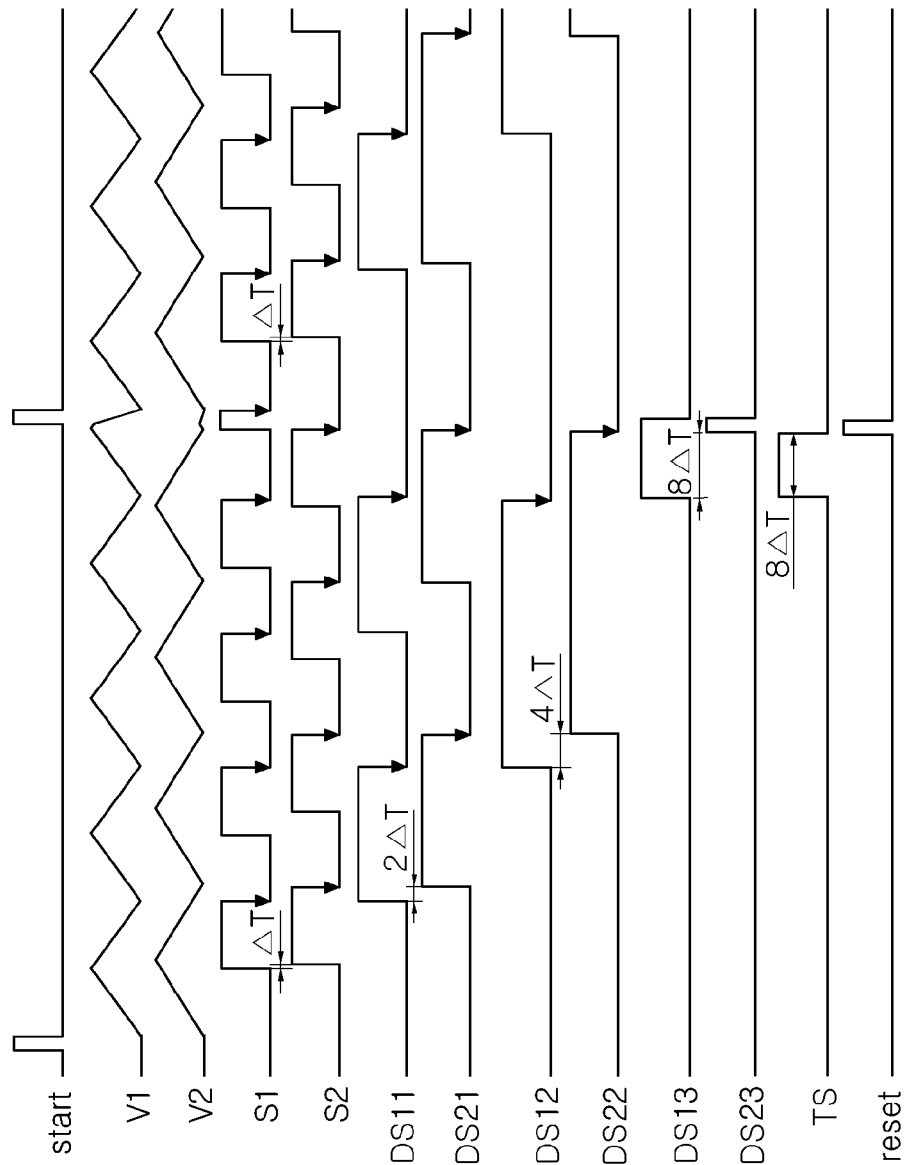
FIG. 8 is a signal timing diagram illustrating the entire configuration of the circuit for converting a capacitance-to-time deviation according to an exemplary embodiment of the present invention.

FIG. 8 is a signal timing diagram illustrating the entire operation of the circuit for converting a capacitance-to-time deviation according to the exemplary embodiment of the present invention.

In FIG. 8, for the convenience of explanation, it is assumed that the first signal frequency dividing unit 31 and the second signal frequency dividing unit 32 of the capacitance deviation amplifying unit 30 include D flip-flops D11 to D13 and D21 to D23 connected in three stages, respectively.

First, when the driving signal start is clocked and the circuit for converting a capacitance-to-time deviation is driven, the first and second capacitance detecting units 21 and 22 of the capacitance deviation detecting unit 20 perform the charging and discharging operation by using the first and second capacitors Cs1 and Cs2, respectively, to generate the two detection signals S1 and S2 that have the phase difference $\Delta T$ corresponding to the capacitance deviation between the first and second capacitors Cs1 and Cs2.

The first and second signal dividing units 31 and 32 in the capacitance deviation amplifying unit 30 transmit the two detection signals S1 and S2 through the D flip-flops D11 to D13 and D21 to D23, respectively, connected in the three stages, and divide the frequencies of the detection signals S1 and S2, respectively, by 8 to amplify the phase difference $\Delta T$ by 8 times.

Then, the XOR logic gate XOR of the time signal generating unit 40 performs the logical XOR operation of the two frequency-divided signals DS13 and DS23 that are output from the first and second signal frequency dividing units 31 and 32, respectively, to generate and output the time signal TS that has a pulse width corresponding to a phase difference $8\Delta T$ amplified by 8 times.

The AND logic gate AND performs a logical AND operation of the two frequency-divided signals DS1n and DS2n to generate a reset signal reset and applies the reset signal reset to the capacitance deviation detecting unit 20 and the capacitance deviation amplifying unit 30. Here, the reset signal reset is shifted from a low level to a high level when the time signal TS is shifted from a high level to a low level.

The capacitance deviation detecting unit 20 and the capacitance deviation amplifying unit 30 are initialized in response to the reset signal reset, and the two frequency-divided signals DS13 and DS23 are shifted from a high level to a low level.

The reset signal reset is shifted from a high level to a low level and again to be in a state in which a new detecting operation can be performed.

While the present invention has been shown and described in connection with the exemplary embodiments, it will be apparent to those skilled in the art that modifications and variations can be made without departing from the spirit and scope of the invention as defined by the appended claims.

The invention claimed is:

1. A high resolution circuit for converting a capacitance difference between a first and second capacitance into a phase difference between two pulse signals, the circuit comprising:
    a capacitance deviation detecting unit configured to generate first and second detection pulse signals having first and second frequencies corresponding to the first and second capacitances of a capacitive sensor, respectively;
    a capacitance deviation amplifying unit configured to divide the frequencies of the first and second detection pulse signals to amplify a phase difference between the first and second detection pulse signals; and
    a time signal generating unit configured to generate a time signal having a pulse width corresponding to the amplified phase difference,
    wherein the capacitance deviation detecting unit comprises first and second capacitance detecting units configured to generate the first and second detection pulse signals, respectively, and
    wherein the first capacitance detecting unit comprises:
    a first comparator configured to output the first detection pulse signal having a first logical value when a first input node charged and discharged according to the first capacitance has a voltage level equal to or less than that of a first reference voltage, and otherwise to output the first detection pulse signal having a second logical value;
    a first charging switch configured to apply a charging current to the first input node when the first detection pulse signal has the first logical value; and
    a first discharging switch configured to discharge the first input node charged according to the first capacitance when the first detection pulse signal has the second logical value.

2. The circuit according to claim 1, wherein at least one of the first capacitance and the second capacitance has a capacitance value varying in response to an external stimulus.

3. The circuit according to claim 1, wherein the first capacitance detecting unit further comprises a first driving switch configured to discharge the first input node charged according to the first capacitance to initialize the first capacitance detecting unit.

4. The circuit according to claim 1, wherein the second capacitance detecting unit comprises:
    a second comparator configured to output the second detection pulse signal having the first logical value when a second input node charged and discharged according to the second capacitance has a voltage level equal to or less than that of the reference voltage, and otherwise to output the second detection pulse signal having the second logical value;
a second charging switch configured to apply a charging current to the second input node when the second detection pulse signal has the first logical value; and
a second discharging switch configured to discharge the second input node charged according to the second capacitance when the second detection pulse signal has the second logical value.

5. The circuit according to claim 4, wherein the second capacitance detecting unit further comprises a second driving switch configured to discharge the second input node charged according to the second capacitance to initialize the second capacitance detecting unit.

6. The circuit according to claim 1, wherein the capacitance deviation amplifying unit comprises:
a first signal frequency dividing unit configured to divide the frequency of the first detection pulse signal to generate a first frequency-divided signal; and
a second signal frequency dividing unit configured to divide the frequency of the second detection pulse signal to generate a second frequency-divided signal,
wherein the first signal frequency dividing unit comprises a plurality of first D flip-flops serially connected in multiple stages, each of the first D flip-flops having an inverted output fed back as an input and receiving an output signal of a D flip-flop of a previous stage as a clock, and
wherein the second signal frequency dividing unit comprises a plurality of second D flip-flops serially connected in multiple stages, each of the second D flip-flops having an inverted output fed back as an input and receiving an output signal of a D flip-flop of a previous stage as a clock.

7. The circuit according to claim 6, wherein the first D flip-flop positioned at a first stage among the plurality of first D flip-flops receives the first detection pulse signal as a clock, and each of the other first D flip-flops receives an output signal of a D flip-flop of a previous stage as a clock.

8. The circuit according to claim 6, wherein the second D flip-flop positioned at a first stage among the plurality of second D flip-flops receives the second detection pulse signal as a clock, and each of the other second D flip-flops receives an output signal of a D flip-flop of a previous stage as a clock.

9. The circuit according to claim 6, wherein the time signal generating unit comprises a first logic gate configured to perform a logical exclusive OR (XOR) operation on the first frequency-divided signal and the second frequency-divided signal as inputs, to generate the time signal.

10. The circuit according to claim 9, wherein the time signal generating unit further comprises a second logic gate configured to perform a logical AND operation on the first frequency-divided signal and the second frequency-divided signal as inputs, to generate a reset signal for initializing operations of the capacitance deviation detecting unit and the capacitance deviation amplifying unit.

11. The circuit according to claim 10, wherein the first signal frequency dividing unit comprises a plurality of first D flip-flops serially connected in multiple stages, each of the plurality of first D flip-flops being initialized in response to the reset signal.

12. The circuit according to claim 10, wherein the second signal frequency dividing unit comprises a plurality of second D flip-flops serially connected in multiple stages, each of the plurality of second D flip-flops being initialized in response to the reset signal.

13. The circuit according to claim 1, wherein the first capacitance detecting unit is configured to be initialized in response to a driving signal supplied from the outside.

14. The circuit according to claim 1, wherein the second capacitance detecting unit is configured to be initialized in response to a driving signal supplied from the outside.

15. A high resolution circuit for converting a capacitance variation into a phase difference between two pulse signals, the circuit comprising:
a capacitance deviation detecting unit configured to generate first and second detection pulse signals having first and second frequencies corresponding to first and second capacitances of a capacitive sensor, respectively;
a capacitance deviation amplifying unit configured to amplify a phase difference between the first and second detection pulse signals and including first and second signal frequency dividing units configured to divide the frequencies of the first and second detection pulse signals and generate first and second frequency-divided signals, respectively; and
a time signal generating unit configured to generate a time signal having a pulse width corresponding to the amplified phase difference,
wherein the first signal frequency dividing unit comprises a plurality of first D flip-flops serially connected in multiple stages, each of the first D flip-flops having an inverted output fed back as an input and receiving an output signal of a D flip-flop of a previous stage as a clock, and
wherein the second signal frequency dividing unit comprises a plurality of second D flip-flops serially connected in multiple stages, each of the second D flip-flops having an inverted output fed back as an input and receiving an output signal of a D flip-flop of a previous stage as a clock.

16. The circuit of claim 15, wherein the capacitance deviation detecting unit comprises first and second capacitance detecting units configured to generate the first and second detection pulse signals, respectively, and
wherein the first capacitance detecting unit comprises:
a first comparator configured to output the first detection pulse signal having a first logical value when a first input node charged and discharged according to the first capacitance has a voltage level equal to or less than that of a first reference voltage, and otherwise to output the first detection pulse signal having a second logical value;
a first charging switch configured to apply a charging current to the first input node when the first detection pulse signal has the first logical value; and
a first discharging switch configured to discharge the first input node charged according to the first capacitance when the first detection pulse signal has the second logical value.

17. The circuit according to claim 16, wherein the first capacitance detecting unit further comprises a first driving switch configured to discharge the first input node charged according to the first capacitance to initialize the first capacitance detecting unit.

18. The circuit according to claim 16, wherein the second capacitance detecting unit comprises:
a second comparator configured to output the second detection pulse signal having the first logical value when a second input node charged and discharged according to the second capacitance has a voltage level equal to or less than that of the reference voltage, and otherwise to output the second detection pulse signal having the second logical value;

a second charging switch configured to apply a charging current to the second input node when the second detection pulse signal has the first logical value; and a second discharging switch configured to discharge the second input node charged according to the second capacitance when the second detection pulse signal has the second logical value.

19. The circuit according to claim 18, wherein the second capacitance detecting unit further comprises a second driving switch configured to discharge the second input node charged according to the second capacitance to initialize the second capacitance detecting unit.

* * * * *